4819X
W. Janes.
Bending Tires, &c.
Patented Jul. 14, 1887.
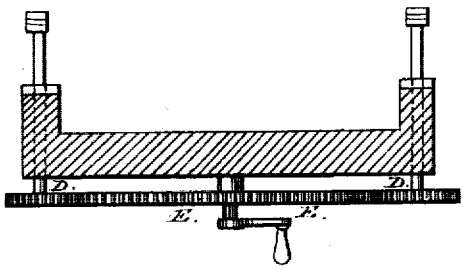
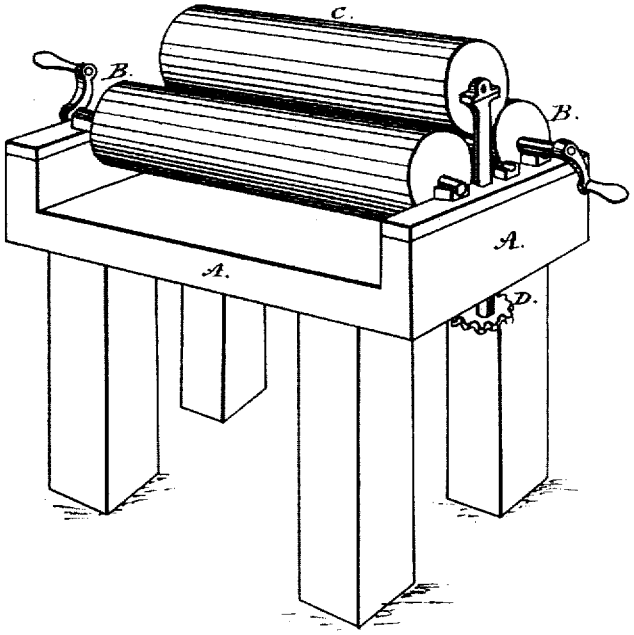
N. PETERS, PHOTO-LITHOGRAPHER, WASHINGTON, D. C.

38

X0004819

May 14 1827

Walter Janes
Letters Patent

The Schedule referred to in these Letters Patent and making part of the same containing a description in the words of the said Walter Janes himself of his Improvement in the Machine for bending tire for Carriage & other wheels, for other bands & hoops &c This invention is an improvement on a machine already patented by me for the purpose above specified; and this improvement consists in Elevating or lowering the third or upper roller to a [illegible] any time required keeping it at all times parallel with the other two rollers which is effected by the machinery hereinafter described.

This machine consists of a bench or platform of plank supported by four legs or posts, on each side of this bench a piece of plank is placed edgewise, at the clear distance of the length of the rollers to be used and of sufficient width and thickness to resist any strain that may be applied in use. On the upper edges of the planks several indents or half boxes are made or in plates of iron supported by them and the whole bolted through to the bench by four screw bolts. Two rollers having each a crank are placed across whose gudgeons work in the indents or half boxes at any required distance from the centre & so that one crank may be on each side. The third or upper roller which lies directly over the centre and parallel with the other two is supported by its gudgeons in the heads of two screw bolts which pass perpendicularly down through the centre of the side planks and receive nuts on their lower ends. On these nuts are placed equal pinions which are worked by a centre wheel which is operated by a crank and serves to raise or lower the upper roller so as to fit its position to any particular work.

This wheel the pinions & nuts are supported up to the bottom of the bench by a plate; & this with the wheel pinions nuts and two head screw bolts on which the nuts play constitute the principal merits of the improvement Ex [illegible]

Walter Janes

Witnesses { Horace E. Preston
Arthur [illegible] Janes }